United States Patent

Schiesterl et al.

[11] 3,781,788
[45] Dec. 25, 1973

[54] VEHICLE LIQUID LEVEL MONITOR FOR PASSENGER PROTECTION INSTALLATIONS

[75] Inventors: Gerhard Schiesterl, Stuttgart; Hans-Ulrich Kuhn, Hohenacker, both of Germany

[73] Assignee: Daimler-Benz Aktiengesellschaft, Stuttgart-Unterturkheim, Germany

[22] Filed: Mar. 24, 1972

[21] Appl. No.: 237,720

[30] Foreign Application Priority Data
Mar. 25, 1971  Germany................. P 21 14 535.7

[52] U.S. Cl.............................. 340/59, 340/52 H
[51] Int. Cl. .......................................... B60r 21/00
[58] Field of Search..................... 340/52 H, 53, 59, 340/244; 200/61.45; 180/103, 104

[56] References Cited
UNITED STATES PATENTS
3,339,411  9/1967  Riffie .................. 340/244 C X
3,633,159  1/1972  Dillman ..................... 340/52 H
3,461,447  8/1969  Marouby...................... 340/59 X Primary Examiner—Alvin H. Waring
Attorney—Paul M. Craig, Jr. et al.

[57] ABSTRACT

A passenger protection installation for vehicles, especially for motor vehicles, which includes at least one air bag that is adapted to be inflated when the vehicle exceeds a predetermined deceleration value, by means of a pressure gas that is developed from a liquefied gas within a pressure gas producer; the pressure gas producer includes a tank for the liquefied gas whereby at least one electrode is provided in the tank which, in relation to a predetermined minimum level of the liquefied gas in the tank, is electrically conductive with respect to the conductive liquefied gas only above this level and at least in its area directly adjacent thereto; when the tank is filled above its minimum level, the electrode is conductively connected by way of the liquefied gas with a connecting element, such as a second electrode, which in turn is connected with a shifting element that closes a further circuit containing an indicating device and/or a control device when the first circuit is interrupted.

16 Claims, 3 Drawing Figures

PATENTED DEC 25 1973　　　　　　　　　　　　　　　　3,781,788

VEHICLE LIQUID LEVEL MONITOR FOR PASSENGER PROTECTION INSTALLATIONS

The present invention relates to a passenger protection installation for vehicles, especially for motor vehicles, which includes at least one air bag inflatable by means of a pressure gas when the vehicle exceeds a predetermined deceleration value, which pressure gas is developed from a liquid gas in a pressure gas producer that includes at least one storage tank for the liquid gas.

For a completely satisfactory functioning of the protective installation, it is a prerequisite that always so large a liquid gas quantity is contained in the tank or container that a pressure gas quantity sufficient for the filling of the air bag, i.e., for the inflation thereof at least up to a predetermined minimum pressure can be developed in the pressure gas producer. Starting with this recognition, the present invention is concerned with the task to provide a monitoring system which indicates when the liquefied gas contained in the tank drops below a corresponding minimum level and which thus indicates a damage of the protective installation.

This is achieved according to the present invention in that at least one electrode is provided in the tank or container, which electrode, in relation to a predetermined minimum level of liquefied gas in the tank, is conductive with respect to the electrically conductive liquefied gas exclusively above this level and at least in its area adjacent thereto and which is conductively connected by way of the liquefied gas when the tank is filled above the minimum level, with a connecting element which in turn is conductively connected with a switching element, by means of which a further circuit is adapted to be closed when the circuit containing the electrode and connecting element is opened, which further circuit includes an indicating and/or control device. A simple and operationally reliable monitoring installation is created by the construction of the present invention, by means of which not only a failure of the passenger protection installation can be signalled to the vehicle user but possibly also control elements of any conventional type can be actuated which enforce an interruption of the driving operation for eliminating the damage.

Depending on the arrangement and the construction of the storage tank, it may also be appropriate to arrange the electrode starting from the bottom side of the tank and to construct the same insulated within its area between the bottom side of the tank and the predetermined minimum level of the liquefied gas. A further possibility for the arrangement of the electrode within the scope of the present invention consists in arranging the electrode to start from the top side of the container above the predetermined minimum level in order to exclude an erroneous indication of the monitoring system as may occur otherwise in case of inadequacies in the insulation of the electrode. In that connection, it may also be appropriate to make the tank itself of electrically non-conductive material in order to make impossible a current bridge between the electrode and the connecting element independently of the liquid level.

In order to preclude erroneous indications by movements of the liquefied gas in the tank in connection with tanks which are to be utilized for many differing applications and therefore are possibly dimensioned too large for a particular application and hence have a relatively low minimum level, it may be appropriate that at least a portion of the conductive section of the electrode conductive with respect to the liquefied gas extends parallel to the liquid level.

In one embodiment of the present invention, the connecting element may be constituted by a second electrode. A simple over-all construction is thereby attainable in that the second electrode forming the connecting element is constructed and arranged correspondingly to the first electrode. In contradistinction to the first electrode, the second electrode may, however, be arranged within the scope of the present invention with its section conductive with respect to the liquefied gas at least partially below the minimum level.

If the tank consists within the purview of the present invention of a conductive material, as is for example, of metal, and if the tank is insulated on the outside, then it is further possible to utilize the tank wall as connecting element and a connecting contact or terminal provided thereat so that a separate electrode can be dispensed with for the connecting element.

Within the scope of the present invention, a normally closed contact relay may be provided as shifting or switching element which drops off, i.e., becomes de-energized and thus closes a further circuit upon interruption of the first circuit. The substitution of the normally closed contact relay by a corresponding transistor circuit, however, is naturally also possible within the frame of the present invention.

If the monitoring system according to the present invention, in which a lamp arranged in the usual manner at the instrument panel of the motor vehicle may serve as indicating instrument, is to be utilized as passenger protective installation, in which the liquefied gas provided in the tank is not conductive as such, then within the scope of the present invention an additive of any conventional type, known as such, is added to this gas which brings about the electrical conductivity thereof.

The heat necessary for the conversion of the gas from its liquefied condition into its gaseous condition may be produced within the frame of the present invention by an explosive cartridge arranged in the tank, which explosive cartridge is adapted to be ignited by way of a conventional sensor in dependence on a predetermined deceleration value of the vehicle. For the completion of the monitoring system provided for the passenger protective installation, it is thereby appropriate if a monitoring system is also coordinated to the sensor and/or to the ignition system for the cartridge triggered thereby, by means of which the indicating and/or control device provided in the further circuit is adapted to be controlled.

Accordingly, it is an object of the present invention to provide a passenger protective installation for vehicles, especially for passenger motor vehicles which effectively eliminates the aforementioned shortcomings and drawbacks encountered in the prior art.

Another object of the present invention resides in a protective installation for motor vehicles in which the prerequisites for proper operation thereof, in particular the sufficiency of the quantity of liquefied gas needed to inflate the air bags, is reliably monitored at all times.

A further object of the present invention resides in a monitoring system for protective installations of vehicles equipped with an inflatable air bag, which assures proper operability of the installation by appropriate monitoring thereof.

Still another object of the present invention resides in a monitoring system of the type described above which is simple in construction and reliable in operation and which permits versatility in its application.

A further object of the present invention resides in a protective system of the type described above which is simple in its over-all construction and assembly, yet effectively monitors the presence of the required liquefied gas quantity as well as the proper functioning of the ignition means producing the necessary heat to convert the gas from its liquefied into its gaseous condition to the extent required for the inflation of the air bag.

These and further objects, features and advantages of the present invention will become more apparent from the following description when taken in connection with the accompanying drawing which shows, for purposes of illustration only, several embodiments in accordance with the present invention, and wherein.

Figure 1:
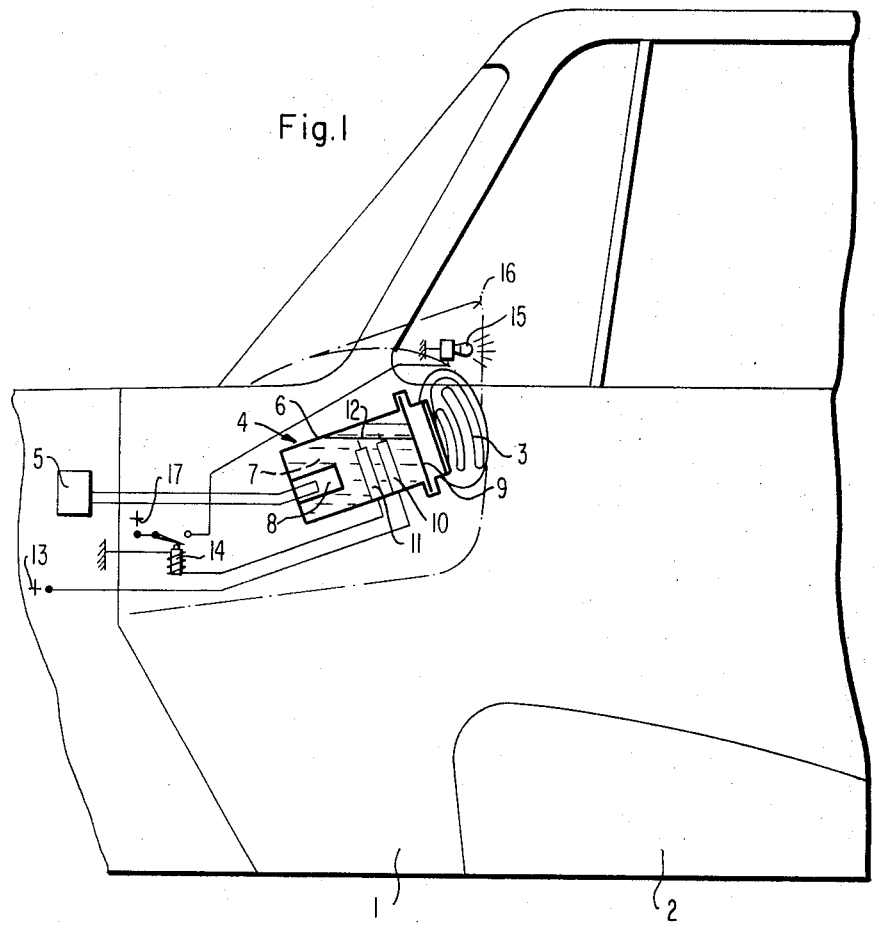
FIG. 1 is a schematic view of a section of a cell of a motor vehicle which is equipped on the front side thereof, for example, in front of the co-driver seat, with a passenger protective installation according to the present invention.

Referring now to FIG. 1 of the drawing, reference numeral 1 designates the cell of a passenger motor vehicle, illustrated only partially and schematically, which is equipped with protective installations for the vehicle passengers, of which only the protective installation coordinated to the co-driver seat 2 is illustrated in the given embodiment.

The passenger protection installation which is illustrated in the single figure of the drawing and which is coordinated to the co-driver seat 2 disposed alongside the driver seat, includes an air bag 3 illustrated herein in its folded-together rest position, to which is coordinated a pressure gas producer generally designated by reference numeral 4, which is adapted to be activated by a conventional sensor system 5 indicated only schematically, when the vehicle exceeds a predetermined deceleration value, and which inflates the air bag 3 upon activation thereof.

The pressure gas producer 4 includes in the illustrated embodiment a tank 6 that is filled at least for the most part with liquefied gas 7 and in which is arranged an explosive cartridge 8 of conventional construction which is ignited by way of the sensor 5, when the vehicle exceeds a predetermined deceleration value, and thereby supplies to the liquefied gas 7 present in the tank 6 the heat necessary for converting the same from its liquid into its gaseous condition. By reason of the fact that during this conversion of the gas from its liquid condition into its gaseous condition a considerable volume increase occurs, the developed gas is under considerable pressure. As a result of this pressure or also by means otherwise not illustrated herein, a cover or lid 9 disposed in the transition from the tank 6 to the air bag 3, which is connected with the tank 6, is blasted open so that the pressure gas can flow into the air bag 3 and can cause the same to unfold.

The development of a pressure gas quantity necessary for the inflation of the air bag to its predetermined minimum pressure and therewith also the operating readiness of the passenger protective installation is dependent, inter alia, on the requirement that always a sufficient quantity of liquefied gas is present in the closed container or tank 6. In order to be able to monitor the presence of a corresponding minimum quantity of liquefied gas and to indicate eventual leakages of the tank 6, a monitoring system is coordinated thereto which in the illustrated embodiment includes two electrodes 10 and 11 projecting into the tank 6. The electrodes 10 and 11 are arranged within the tank 6 at a distance to one another in side-by-side relation and are in electrically conductive connection with each other by way of the liquefied gas insofar as the latter has a liquid level lying above a predetermined minimum level 12. Of course, it is prerequisite therefor that the liquefied gas either is already electrically conductive as such or has been made electrically conductive by conventional additives.

The monitoring of the minimum level 12 and therewith the operating readiness of the protective installation is achieved in that at least one of the electrodes, in the embodiment the electrode 10, is in conductive connection with the liquefied gas present in the tank 6 exclusively when the liquefied gas has a liquid level disposed above the minimum level 12. For that purpose, the electrode 10 starting from the tank bottom is provided with an insulation within the area between the tank bottom and the minimum level 12 and is freely exposed exclusively within its area projecting above the minimum level so that when the liquid level drops below the minimum level 12, the electrode 10 is no longer in any conductive connection with the liquefied gas. Since with this arrangement a current flow between the two electrodes 10 and 11 is impossible after the liquefied gas 7 drops below the minimum level 12, the electrode 11 may have an arrangement in which a conductive connection between itself as connecting element and the liquefied gas also still exists when the liquefied gas has dropped below the minimum level. It is possible thereby, with an arrangement of the electrodes 10 and 11 at a differing height, as is illustrated in FIG. 1, or also at the same height to construct the electrodes identically.

If with an arrangement of the electrodes 10 and 11 as illustrated in FIG. 1, the liquefied gas drops below the level 12, i.e., below the upper end of the insulation of the electrode 10, then the current flow between the electrodes 10 and 11 is interrupted of which the electrode 10 is electrically connected with a voltage source 13. As a result thereof, the current energization for a switching element 14 electrically connected with the electrode 11 is discontinued; the switching element 14 is thereby illustrated in the drawing as a normally closed contact relay. As a result of the de-energization of the contact relay 14, a further circuit is closed, in which is connected an indication and/or control installation which in the illustrated embodiment is constituted by a lamp 15 which is arranged within the area disposed in front of the driver seat 2 of the instrument panel 16 only schematically indicated herein. The further circuit, which contains the lamp 15 as indicating instrument, is connected with a voltage source 17 which, like the voltage source 13, may be constituted, for example, by the battery (not shown) of the vehicle.

Of course, the voltage sources 17 and 13 may also be independent of one another.

In order to preclude in the illustrated monitoring system a short-circuiting due to a ground connection of the tank 6, the tank 6 may consist either altogether of electrically non-conductive material or may include an insulating liner which may consist, for example, of a bag of non-conductive material such as, for example, synthetic resinous material or rubber, that is disposed on the inside of the tank 6 and in which the electrodes 10 and 11 are arranged in a fluid-tight manner.

Figure 2:
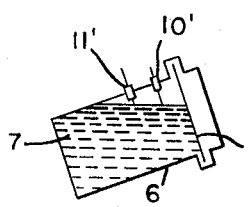
FIG. 2 is a schematic view of an arrangement of two electrode means extending from the top of the tank means according to the present invention.
Figure 3:
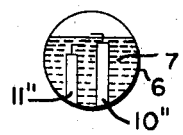
FIG. 3 is a schematic view of two electrode means having the conductive section extending substantially parallel to the liquid level.

As a further feature of the present invention, which is not illustrated herein in detail, a monitoring system possibly provided for the sensor system 5 may also be so connected to the illustrated system that in case of failures in the sensor system 5, the circuit containing the lamp 15 is also closed whereby a complete monitoring of the protective installation is assured. For example, such additional monitoring installation may include a further relay closing the energizing circuit for the lamp 15 in case of failure in the sensor system 5, to be detected by conventional means. In lieu of the lamp 15, of course, also other types of indicating and/or control installations may be provided within the scope of the present invention, whereby the control installations may prevent by conventional means the further driving operation of the vehicle. FIG. 2 illustrates the arrangement of two electrodes 10' and 11' extending from the top of the tank 8 and FIG. 3 illustrates in a sectional view electrodes 10'' and 11'' having the conductive portions extending substantially parallel to the liquid level.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A passenger protective installation for vehicles, especially motor vehicles, which comprises at least one air bag means adapted to be inflated by means of pressure gas when the vehicle exceeds a predetermined deceleration value, the pressure gas being developed from liquefied gas in a pressure gas producer means which includes at least one tank means for a liquefied gas, characterized in that a first circuit means is provided including first and second electrode means arranged in the tank means, said first electrode means in relation to a predetermined minimum level in the tank means being electrically conductive with respect to an electrically conductive liquefied gas exclusively above said predetermined level and at least in the area directly adjacent thereto, said second electrode means being electrically conductive with respect to the liquefied gas at least partially below said predetermined minimum level, said first and second electrode means being in electrically conductive connection in the first circuit means by way of the liquefied gas when the tank means is filled above its minimum level, one of said first and second electrode means being operatively connected with a switching means, said switching means being operatively connected with a further circuit means containing monitoring means, said further circuit means being rendered operable to activate the monitoring means upon interruption of the first circuit means when the level of the liquefied gas falls below said predetermined minimum level.

2. A passenger protective installation according to claim 1, characterized in that said monitoring means includes an indicating device.

3. A passenger protective installation according to claim 1, characterized in that the monitoring means includes a control device.

4. A passenger protective installation according to claim 1, characterized in that at least one of the electrode means starts from the bottom side of the tank means and is insulated within the area thereof disposed between the bottom side of the tank means and the predetermined minimum level of the liquefied gas.

5. A passenger protective installation according to claim 1, characterized in that at least one of the electrode means is arranged starting from the top side of the tank means above the predetermined minimum level of the liquefied gas.

6. A passenger protective installation according to claim 1, characterized in that at least a portion of the section of at least one of the electrode means which is conductive with respect to the liquefied gas, extends substantially parallel to the liquid level.

7. A passenger protective installation according to claim 1, characterized in that the first and second electrode means are disposed lying adjacent one another.

8. A passenger protective installation according to claim 1, characterized in that a normally closed contact relay means is provided as switching means which is de-energized upon interruption of the first circuit means.

9. A passenger protective installation according to claim 1, characterized in that a lamp is provided as indicating instrument for the monitoring means.

10. A passenger protective installation according to claim 1, characterized in that the liquefied gas is provided with an additive effecting the electrical conductivity thereof.

11. A passenger protective installation according to claim 1, in which the gas is converted from its liquid into its gaseous condition by the supply of heat, characterized in that an explosive cartridge means is arranged in the tank means which is ignitable by way of a sensor means in dependence on the predetermined deceleration value, and in that a further monitoring means is coordinated to the sensor means, the further circuit means being operable to be actuated also by said further monitoring means.

12. A passenger protective installation according to claim 11, characterized in that the further circuit means is adapted to be closed by said further monitoring means.

13. A passenger protective installation according to claim 12, characterized in that a lamp is provided as indicating instrument for the monitoring means.

14. A passenger protective installation according to claim 11, characterized in that at least one of said electrode means extends from the bottom side of the tank means.

15. A passenger protective installation according to claim 11, characterized in that at least one of said electrode means extends from the top side of the tank means.

16. A passenger protective installation according to claim 11, characterized in that said first and second electrode means are disposed in side-by-side relation.

* * * * *